United States Patent
Kawatani et al.

(10) Patent No.: US 9,016,780 B2
(45) Date of Patent: Apr. 28, 2015

(54) SEAT STRUCTURE FOR SADDLE-RIDE TYPE VEHICLE

(75) Inventors: Shinji Kawatani, Wako (JP); Yukinori Kurakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 13/423,582

(22) Filed: Mar. 19, 2012

(65) Prior Publication Data

US 2012/0242122 A1     Sep. 27, 2012

(30) Foreign Application Priority Data

Mar. 25, 2011     (JP) .................................. 2011-068121

(51) Int. Cl.
*B62J 1/18* (2006.01)
*B62J 1/12* (2006.01)
*B62J 1/26* (2006.01)

(52) U.S. Cl.
CPC .... *B62J 1/12* (2013.01); *B62J 1/26* (2013.01); *B62J 1/18* (2013.01)

(58) Field of Classification Search
CPC ................. B62J 1/26; B62J 1/18; B62J 1/22; B62J 1/12
USPC .......... 297/195.1, 202, 214, 452.22; 180/219; 280/63; 296/63, 64
See application file for complete search history.

(56) References Cited

U.S. PATENT DOCUMENTS

| 5,348,369 A  * | 9/1994 | Yu ................................. 297/214 |
| 5,356,198 A  * | 10/1994 | Hughes ....................... 297/195.1 |
| 2012/0242118 A1* | 9/2012 | Kawatani et al. ........ 297/188.09 |

FOREIGN PATENT DOCUMENTS

JP     2002-211460     7/2002

* cited by examiner

*Primary Examiner* — Milton Nelson, Jr.
(74) *Attorney, Agent, or Firm* — Rankin, Hill & Clark LLP

(57) ABSTRACT

A seat structure for a saddle-ride type vehicle for an occupant to sit on. The seat structure includes an outer frame portion, left and right frame portions, a seat skin, recessed portions, and a cushion member. The frame portion includes a through-hole formed at least at a seating position for the occupant to sit on. The left and right frame portions are disposed along left and right side surfaces of the vehicle. The seat skin has elasticity and is fixed to the outer frame portion while predetermined tensile force is applied thereto. The seat skin is disposed to cover a portion facing the through-hole. The recessed portions are formed on the left and right frame portions and are recessed toward an inner side in a vehicle width direction. A cushion member is disposed between the left and right frame portions and the seat skin.

12 Claims, 8 Drawing Sheets

SEAT STRUCTURE FOR SADDLE-RIDE TYPE VEHICLE

BACKGROUND OF THE INVENTION

1. Field of the Invention

The present invention relates to a seat structure for a saddle-ride type vehicle.

2. Description of Related Art

For a saddle-ride type vehicle such as a motorcycle, a seat for an occupant to sit on has conventionally been proposed that includes a seat bottom plate, a cushion member such as urethane sponge disposed on an upper surface of the seat bottom plate, and a seat skin that covers an upper surface side of the cushion member (see Japanese Patent Application Publication No. 2002-211460, for example).

In the conventional technique, cushioning property of the seat is secured with the deformation of the cushion member. Therefore, to secure sufficient cushioning property of the seat, a thickness of the cushion member is increased and thus, a seat height becomes large. As a result, reach to the ground during riding is lowered due to the large seat height in the saddle-ride type vehicle. Thus, a technique is called for that can make the seat height small while securing the cushioning property of the seat.

SUMMARY OF THE INVENTION

Thus, an object of the present invention is to provide a seat structure for a saddle-ride type vehicle that can make a seat height small while securing cushioning property of a seat.

In accordance with the present invention, a seat structure for a saddle-ride type vehicle including a vehicle body and a seat, disposed above the vehicle body, for an occupant to sit on, the seat structure characterized by including an outer frame portion including: a through-hole formed at least at a seating position for the occupant to sit on; and left and right frame portions disposed along left and right side surfaces of the vehicle; a seat skin that has elasticity, is fixed to the outer frame portion while predetermined tensile force is applied thereto, and is disposed to cover a portion facing the through-hole; recessed portions formed on the left and right frame portions and recessed toward an inner side in a vehicle width direction; and a cushion member disposed between the left and right frame portions and the seat skin, at least on an upper surface and outer side surfaces in a vehicle width direction of the left and right frame portions on which the recessed portions are formed.

According to this structure, the seating position of the seat includes a portion of the seat skin facing the through-hole. Thus, the cushioning property of the seating position of the seat can be secured with the elastic deformation of the seat skin without disposing the cushion member at the seating position. Thus, the seat height can be made low while securing the cushioning property of the seat.

Further, the legs of the occupant seated on the seat can be positioned at the recessed portions and his or her foot can reach the ground. Thus, high reach to the ground can be secured. While the legs of the occupant contact the recessed portions, soft feel can be given to the legs. Thus, comfortableness of the occupant seated on the seat can be improved.

In further accordance with the present invention, the seat includes round shaped portions formed of the seat skin curved at both left and right sides of the seating position, and the left and right frame portions are disposed below the round shaped portions.

On the saddle-ride type vehicle, the occupant repeatedly switch between a normal state of sitting on the seat and an inclined state where the occupant is seated while displacing his or her body in a vehicle width direction from the seating position for turning or the like. Thus, the seat structure includes the round shaped portions and the left and right frame portions are disposed below the round shaped portions. Thus, the cushioning property of the seating position during the normal state can be secured with the elasticity of the seat skin. In the inclined state, the load of the occupant can be directly received by the round shaped portions and the left and right frame portions positioned below the round shaped portions. Thus, in the inclined state, the load of the occupant can be directly transmitted to the saddle-ride type vehicle. Thus, lightness of the driving operation for turning the vehicle and the like can be improved.

In further accordance with the present invention, the cushion member is disposed between the outer frame portion and the seat skin at a position other than the portion facing the through-hole. Thus, the shape of the seat around the seating position can be formed into a desired shape by the cushion member. Thus, at the portion around the seating position on which the load of the occupant is not largely applied, the cushion member disposed around the through-hole can provide comfortable fit to the legs of the occupant. Thus, comfortableness of the occupant seated on the seat can be improved.

In further accordance with the present invention, an outer edge portion of the outer frame portion is disposed outward of the cushion member in a portion excluding the recessed portions. Thus, the tensile force applied to the seat skin can be directly received by the outer frame portion in the portion excluding the recessed portions. Thus, sufficient tensile force applied to the seat skin can be secured in the seating position. Thus, the comfortableness of the occupant seated on the seat can be improved.

In further accordance with the present invention, the seat structure further includes seat supporting portions disposed at positions overlapping with the recessed portions in the outer frame portion in a vehicle front-rear direction and configured to transmit a load of the seat to the vehicle body. Thus, the load applied to the outer frame portion can be transmitted to the vehicle body (seat rail) through the seat supporting portions. When the load from an outer side is applied to the recessed portion upon turning and the like, the elastic deformation of the outer frame portion as a whole can be reduced while the portion of the outer frame portion positioned outward of the seat supporting portion in the vehicle width direction and the cushion member can be elastically deformed effectively. As a result, comfortableness of the occupant can be further improved. The portion of the outer frame portion positioned outward of the seat supporting portion in the vehicle width direction can be elastically deformed. Thus, the thickness of the cushion member disposed on the outer frame portion can be made small without degrading the comfortableness. Thus, the seat height can be made lower while securing the cushioning property of the seat.

DETAILED DESCRIPTION OF THE PREFERRED EMBODIMENTS

A preferred embodiment of a seat structure of a saddle-ride type vehicle of the present invention will be described with reference to the drawings.

Figure 1:
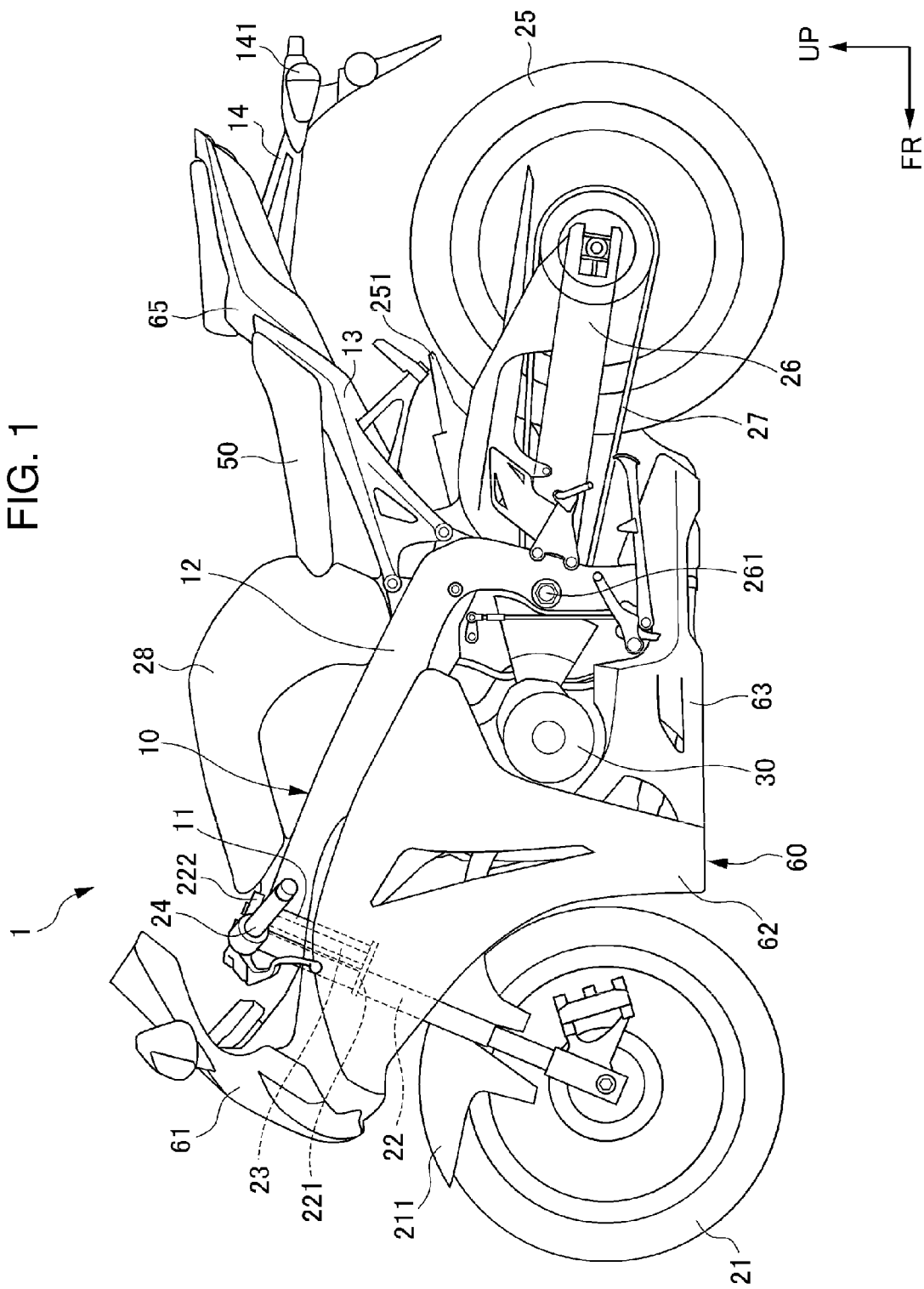
FIG. 1 is a left side view showing a motorcycle as a saddle-ride type vehicle including a seat structure of the present invention.

First, with reference to FIG. 1, an overall structure of a motorcycle 1 as a saddle-ride type vehicle including a seat structure according to an embodiment of the present invention is described. FIG. 1 is a left side view showing the embodiment of the motorcycle 1 including the seat structure of the present invention.

In the explanation given below, descriptions of front-rear, left-right, and upper-lower directions are based on directions viewed from an occupant (a driver) riding the motorcycle unless otherwise specified. In the figure, an arrow FR indicates a front direction of the vehicle while an arrow UP indicates an upper direction of the vehicle.

As shown in FIG. 1, the motorcycle 1 according to this embodiment mainly includes: a vehicle-body frame 10 including a head pipe 11; a front wheel 21 disposed on the front side of the vehicle-body frame 10; a front fender 211 disposed above the front wheel 21; a pair of left and right front forks 22 that axially support the front wheel 21; a steering stem 23 that supports, via a bottom bridge 221 and a top bridge 222, the front forks 22 to be rotatable with respect to the head pipe 11 in a left-right direction; a handle 24 connected to upper ends of the steering stem 23 and the pair of front forks 22; a swing arm 26 suspended from the vehicle-body frame 10 in a vertically swingable manner; a rear wheel 25 rotatably supported by the swing arm 26; a rear fender 251 disposed above the rear wheel 25; an engine 30 suspended from the vehicle-body frame 10; a seat 50 for an occupant to sit on; a fuel tank 28 disposed in front of the seat 50; and a body cover 60 that covers the vehicle-body frame 10.

The vehicle-body frame 10 is formed by integrally connecting a plurality of types of steel materials by welding and the like. As shown in FIG. 1, the vehicle-body frame 10 includes: the head pipe 11; main frames 12; seat rails 13; a rear stay 14; and a plurality of cross members (not shown).

The head pipe 11 is provided at a front end portion of the vehicle-body frame 10.

The main frames 12 are provided as a left and right pair. The main frames 12 have front end sides connected to the head pipe 11. In the side view, the main frames 12 extend obliquely downward toward the rear from the head pipe 11 and are then bent to extend downward.

The seat rails 13 are provided as a left and right pair. The seat rails 13 have front end sides connected to the bent portions of the main frames 12. In the side view, the seat rails 13 extend obliquely upward toward the rear from the connection portions with the main frames 12.

The rear stay 14 is connected to rear end sides of the seat rails 13 and obliquely extends downward toward the rear. Turn signals 141 and a license plate (not shown) are attached to the rear stay 14.

The cross members (not shown) include a pipe member extending in the left-right direction for example, and connect the frames provided as the left and right (main frames 12, down frames 13, and the like).

The engine 30 is a motor of the motorcycle 1 and is installed at a substantially center portion in the vehicle front-rear direction as shown in FIG. 1. The engine 30 is suspended from the main frames 12 at a plurality of supporting points (not shown). Driving force generated by the engine 30 is transmitted to the rear wheel 25 through a power transmission mechanism 27.

The swing arm 26 is disposed between the main frames 12 and the rear wheel 25.

A front end portion of the swing arm 26 is attached to a pivot shaft 261 provided at a predetermined height above a lower end portion of the main frames 12, and is supported to be vertically swingable about the pivot shaft 261. A rear end portion of the swing arm 26 is connected to the rear wheel 25 and rotatably supports the rear wheel 25.

The swing arm 26 is suspended from the main frames 12 by a rear cushion (not shown) disposed between the main frames 12.

The seat 50 is disposed above the seat rails 13. A structure of the seat 50 will be described later in detail.

The fuel tank 28 is disposed in a space in front of the seat 50 and between the main frames 12 above the engine 30.

The body cover 60 includes: a front cowl 61 that covers a front side of the vehicle-body frame 10; and side cowls 62 that continue from rear portions of the front cowl 61 and cover both side surfaces of the front portion of the vehicle-body frame 10; an under cover 63 that is continuous to rear portions of the side cowls 62 and covers a lower portion of the vehicle-body frame 10; a fender cowl 64 that is provided below the seat 50 and covers a lower side of the seat 50 and side surfaces of the vehicle (see FIG. 4); and a rear cowl 65 that covers a rear portion of the vehicle-body frame 10.

Figure 2:
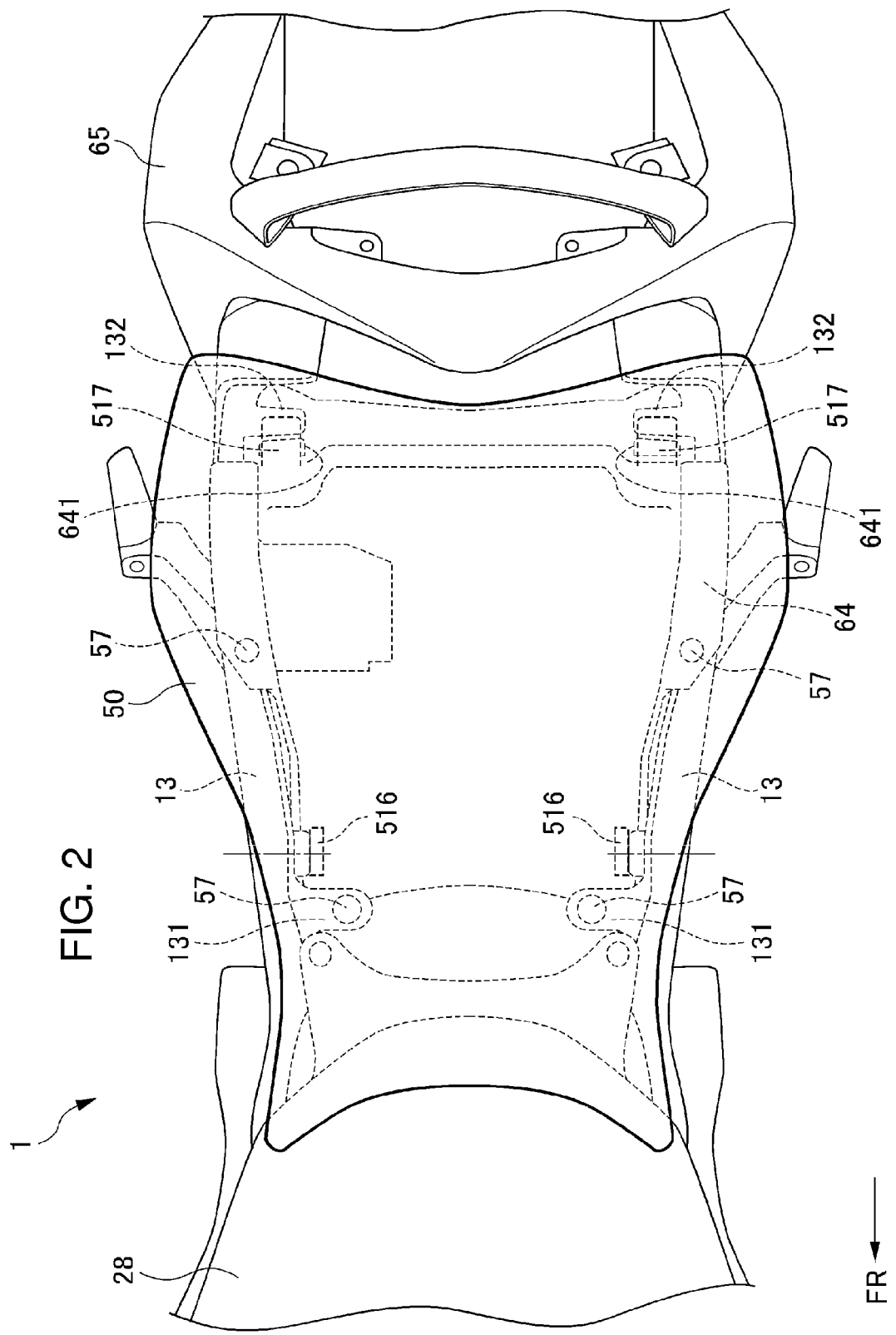
FIG. 2 is a plan view showing a seat structure of the motorcycle shown in FIG. 1.
Figure 3:
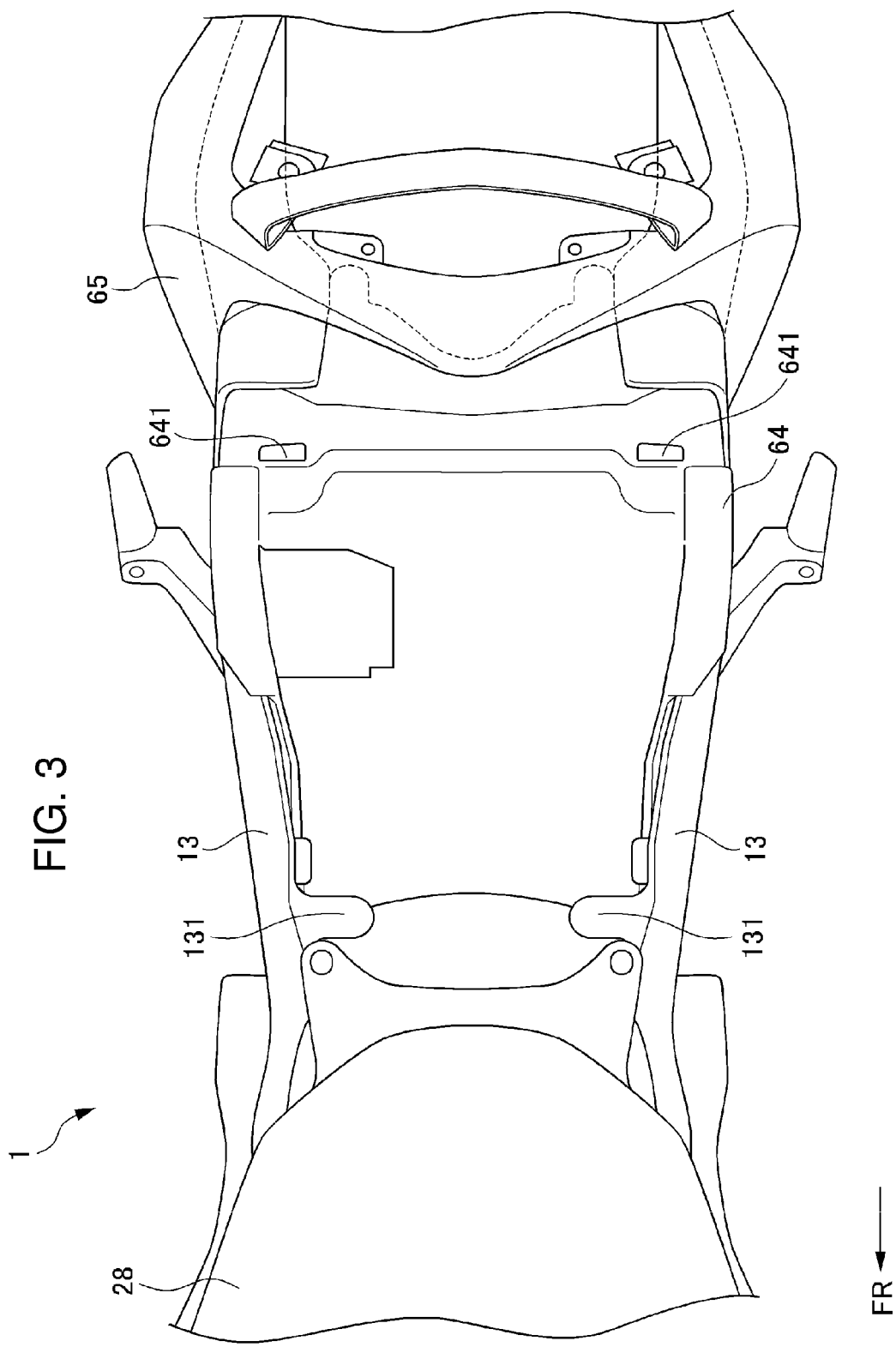
FIG. 3 is a diagram in which a seat is omitted in the plan view of FIG. 2.
Figure 4:
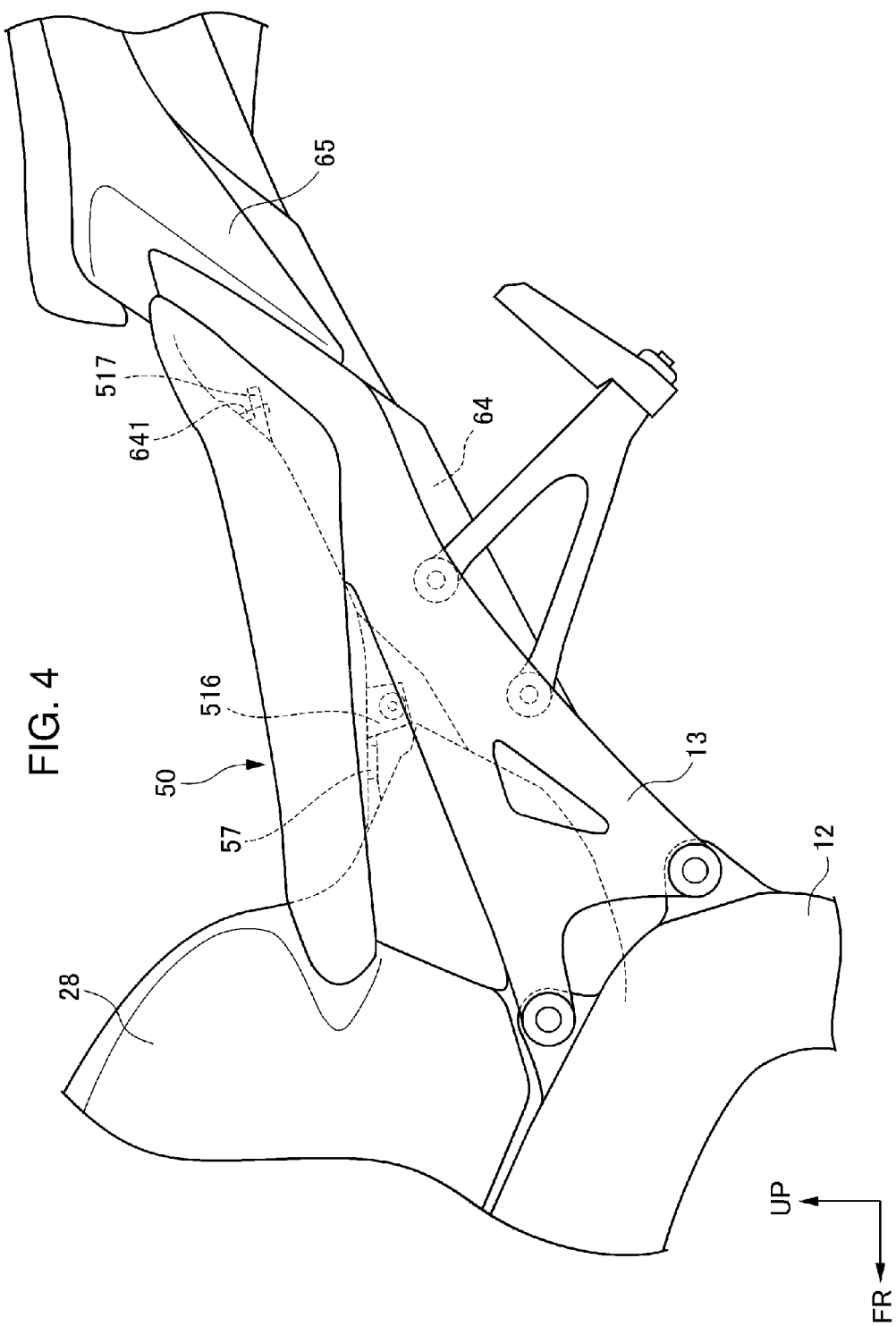
FIG. 4 is a left side view showing a structure of the motorcycle shown in FIG. 1.
Figure 5:
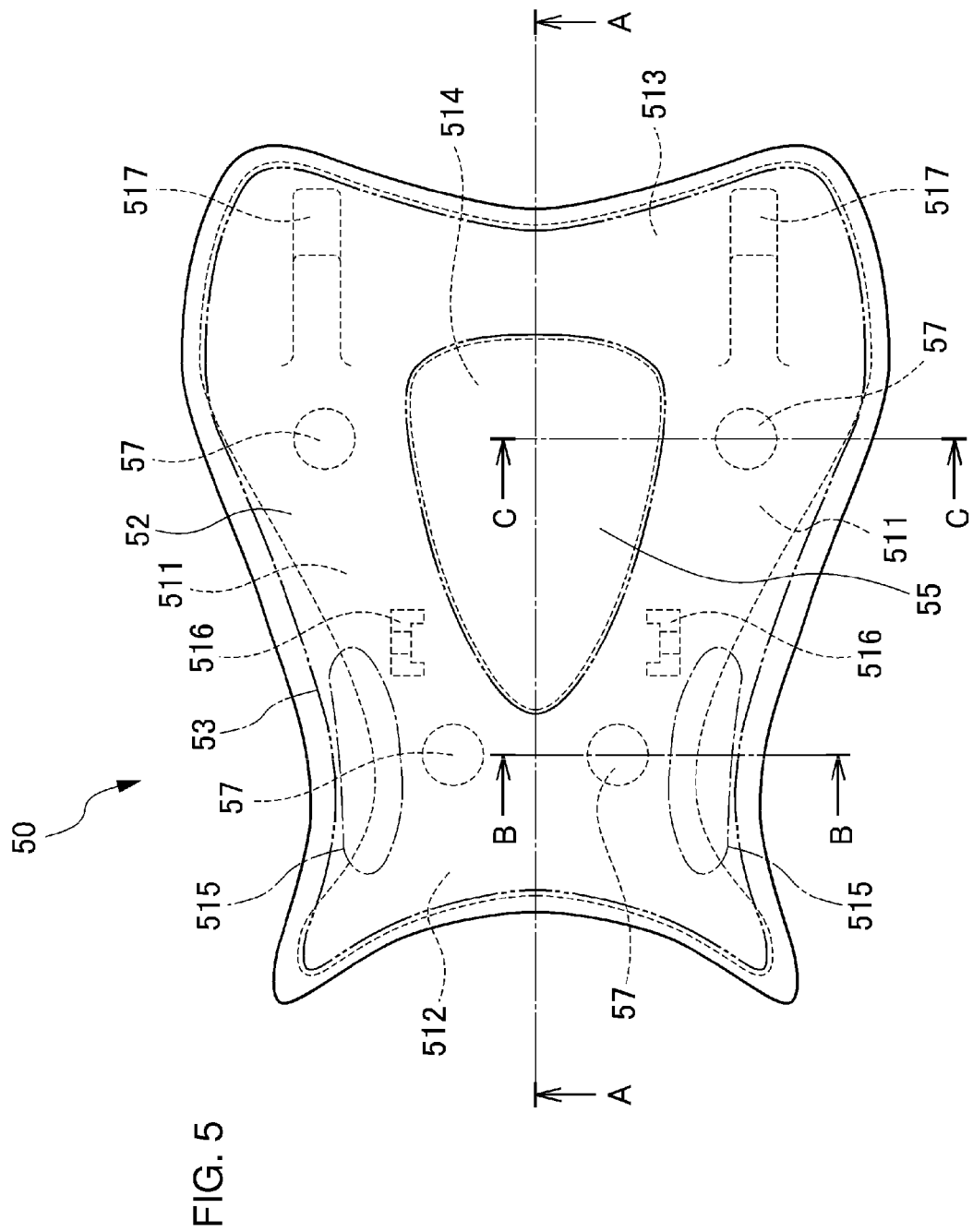
FIG. 5 is a plan view showing the seat of the motorcycle shown in FIG. 1.
Figure 6:
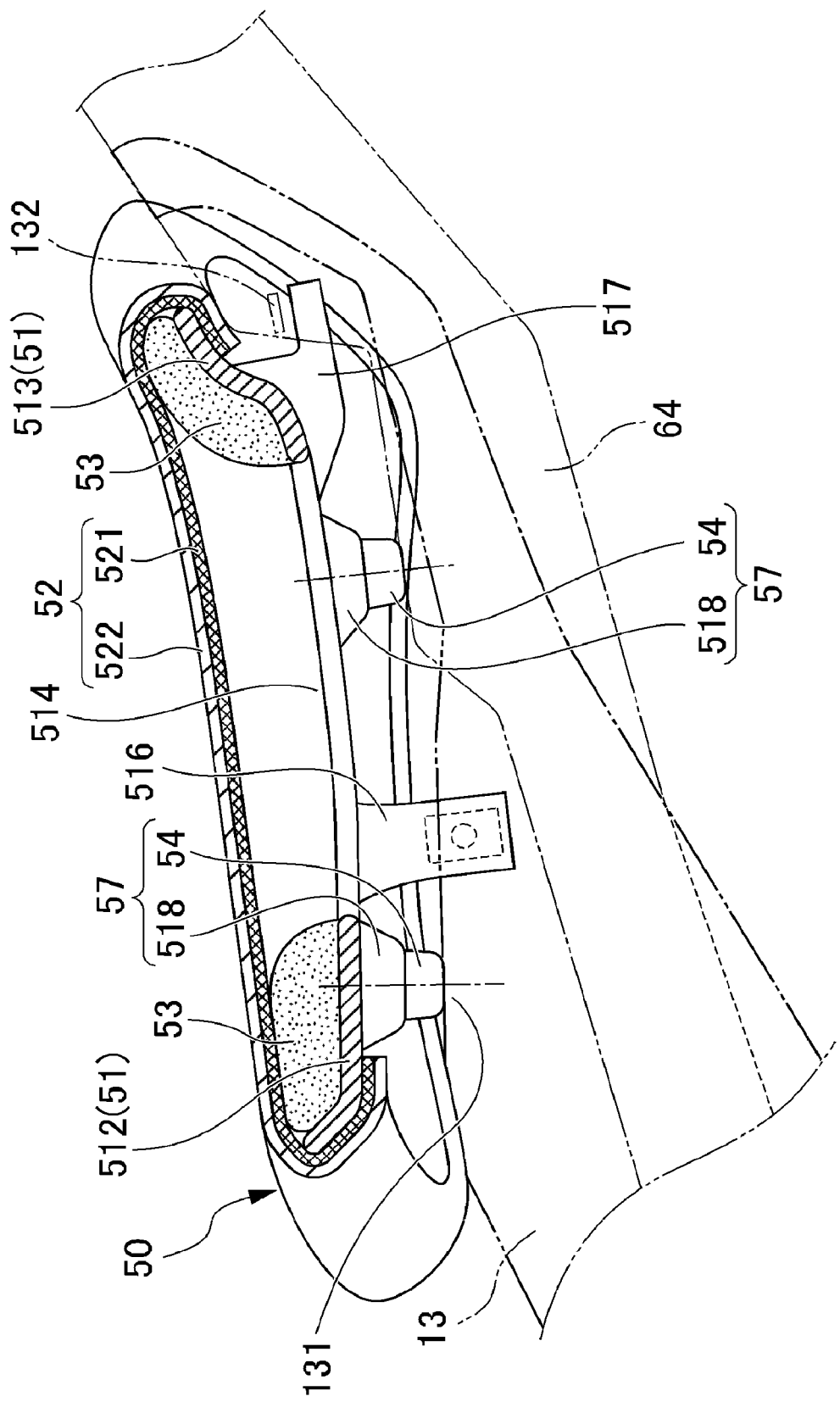
FIG. 6 is a cross-sectional view taken along a line A-A in FIG. 5.
Figure 7:
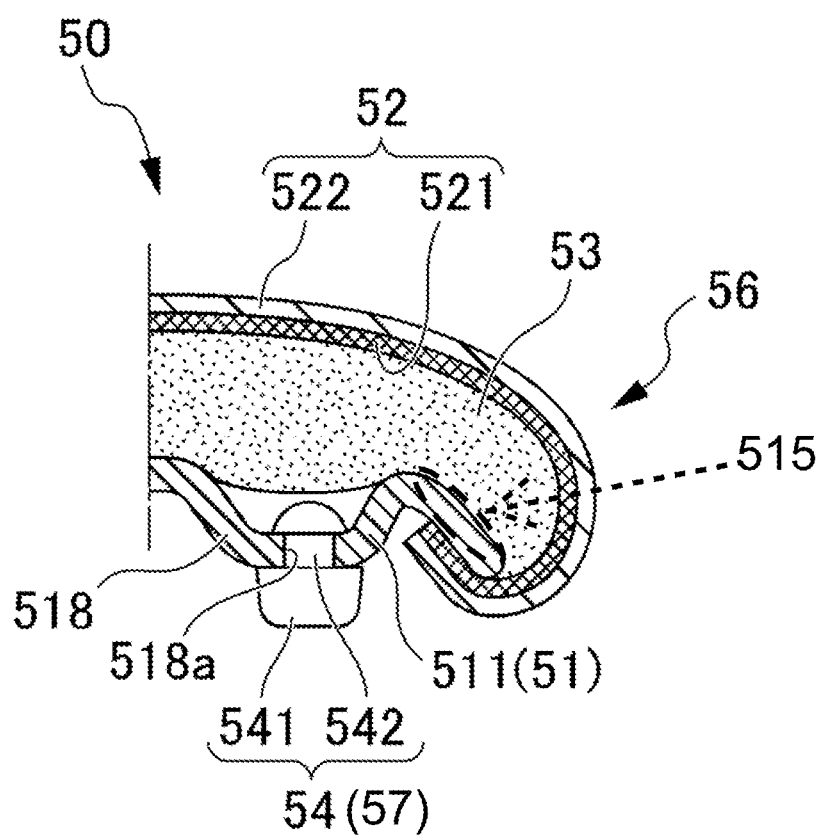
FIG. 7 is a cross-sectional view taken along a line B-B in FIG. 5.
Figure 8:
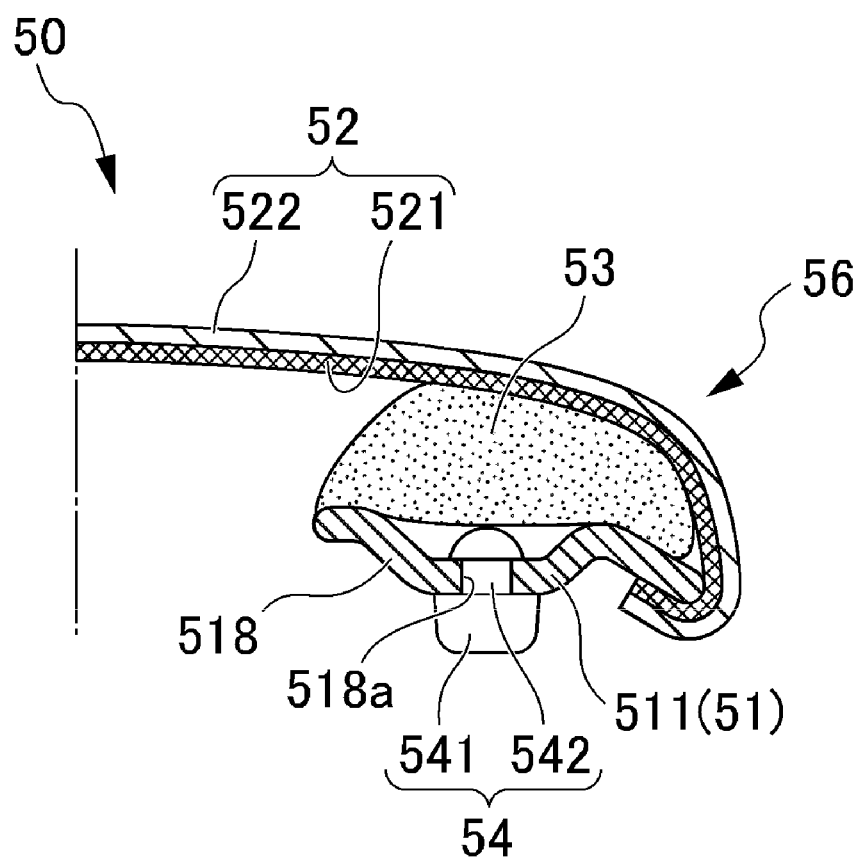
FIG. 8 is a cross-sectional view taken along a line C-C in FIG. 5.

The structure of the seat 50 according to this embodiment will be described. FIG. 2 is an enlarged plan view showing a seat structure portion in the motorcycle 1. FIG. 3 is a diagram in which the seat 50 is omitted in the plan view of FIG. 2. FIG. 4 is an enlarged left side view of the seat structure portion in the motorcycle 1. FIG. 5 is a schematic plan view of the seat structure. FIG. 6 is a cross-sectional view taken along a line A-A in FIG. 5. FIG. 7 is a cross-sectional view taken along a line B-B in FIG. 5. FIG. 8 is a cross-sectional view taken along a line C-C in FIG. 5.

As shown in FIG. 2 to FIG. 4, the seat 50 of this embodiment is disposed behind the fuel tank 28 and on upper surface sides of the seat rails 13. As shown in FIG. 5 and FIG. 6, the seat 50 includes an outer frame portion 51, a seat skin 52 disposed on an upper surface side of the outer frame portion 51, a cushion member 53 disposed between the outer frame portion 51 and the seat skin 52, and seat supporting members 54 disposed on a lower surface of the outer frame portion 51. The seat 50 includes a seating position 55 formed in a center portion in an upper surface of the seat 50, round shaped portions 56 disposed on both left and right sides of the seating position 55; and seat supporting portions 57 disposed on the lower surface of the outer frame portion 51.

The outer frame portion 51 is integrally formed of a hard material such as a hard resin and forms a frame of the seat 50. As shown in FIG. 5 and FIG. 6, the outer frame portion 51 includes: left and right frame portions 511, a front frame portion 512, a rear frame portion 513, a through-hole 514, recessed portions 515 respectively formed on the left and right frame portions 511, a pair of fastening portions 516, a pair of protruding portions 517, and supporting member attachable portions 518.

The left and right frame portions 511 form a left side portion and a right side portion of the outer frame portion 51 and are disposed along a vehicle front-rear direction. As shown in FIG. 5, in the plan view, outer edges of the left and right frame portion 511 are recessed toward inner side in the vehicle width direction at positions on the front side of the center portion in the vehicle front-rear direction.

As shown in FIG. 7 and FIG. 8, the outer edge portions of the left and right frame portions 511 extend obliquely downward toward the outer side in the vehicle width direction.

The front frame portion 512 forms a front end portion of the outer frame portion 51 and is disposed along the vehicle width direction. In the plan view, an outer edge of the front frame portion 512 is curved to recess toward the rear. As shown in FIG. 6, the outer edge portion of the front frame portion 512 extends obliquely downward toward the front.

The rear frame portion 513 forms a rear end portion of the outer frame portion 51 and is disposed along the vehicle width direction. In the plan view, an outer edge of the rear frame portion 513 is curved to recess toward the front. The outer edge portion of the rear frame portion 513 extends obliquely downward toward the rear.

The through-hole 514 is formed at a position corresponding to the seating position 55. More specifically, the through-hole 514 is formed at the substantially center portion of the outer frame portion 51.

The recessed portions 515 are formed of recessed portions in the left and right frame portions 511.

As shown in FIG. 5 and FIG. 6, the pair of fastening portions 516 are disposed on front portions of lower surfaces of the left and right frame portions 511 and protrudes downward. The pair of fastening portions 516 are formed into plate-like shapes and is disposed to extend along inner surfaces of the pair of seat rails 13 (see FIG. 2).

The pair of protruding portions 517 are disposed on rear portions of the lower surfaces of the left and right frame portions 511. The pair of protruding portions 517 extend downward from the lower surfaces of the left and right frame portions 511 and then are bent to have distal ends protruding toward the rear.

As shown in FIG. 5 to FIG. 8, the supporting member attachable portions 518 are formed as a pair on each of a front portion and a rear portion of the lower surface of the outer frame portion 51. The supporting member attachable portions 518 are each formed of a portion of the outer frame portion 51 bulging downward. As shown in FIG. 7 and FIG. 8, a through-hole 518a is formed at a center portion of each supporting member attachable portion 518. The supporting member attachable portions 518 formed in the front portion of the outer frame portion 51 are disposed at positions overlapping with the recessed portions 515 in the outer frame portion 51 in the vehicle front-rear direction. More specifically, the supporting member attachable portions 518 are disposed on the inner side of the recessed portions 515 in the vehicle width direction on the lower surface of the outer frame portion 51. The supporting member attachable portions 518 formed in the rear portion of the outer frame portion 51 are disposed in front of the pair of protruding portions 517 on the lower surface of the outer frame portion 51.

The seat skin 52 has elasticity and covers an entire area of an upper surface side of the outer frame portion 51. As shown in FIG. 6 to FIG. 8, the seat skin 52 includes an elastic seat member 521 disposed on the outer frame portion 51 side and a skin seat member 522 disposed on an upper surface of the elastic seat member 521.

The elastic seat member 521 has predetermined elasticity. As the elastic seat member 521, a mesh fabric having flexibility that is formed by weaving a polyester fabric into a mesh shape can be used.

The skin seat member 522 has waterproof property and antiweatherability. As the skin seat member 522, a seat member made of a synthetic resin material such as vinyl chloride can be used.

The cushion member 53 is disposed between the upper surface of the outer frame portion 51 and the seat skin 52. As shown in FIG. 5 to FIG. 8, the cushion member 53 is disposed between the upper surface of the outer frame portion 51 and the seat skin 52 at most part of the region excluding a portion facing the through-hole 514.

More specifically, as shown in FIG. 7, at portions where the recessed portions 515 are formed in the left and right frame portions 511, the cushion member 53 is disposed between the left and right frame portions 511 and the seat skin 52 on the upper surface and side surfaces in the vehicle width direction of the left and right frame portions 511.

As shown in FIG. 5, FIG. 6, and FIG. 8, the cushion member 53 is disposed at a position inward of the outer edge portion of the outer frame portion 51 in a portion of the outer frame portion 51 excluding the recessed portions 515. In other words, the outer edge portion of the outer frame portion 51 is positioned outward of the cushion member 53 in the portion excluding the recessed portions 515.

The above-described seat 50 is formed by disposing the cushion member 53 on the upper surface of the outer frame portion 51 at predetermined regions of the portion at which the through-hole 514 is not formed and then covering the upper surface side of the cushion member 53 with the seat skin 52.

Here, the seat skin 52 has peripheral a portion tucked into the lower surface side at a peripheral portion of the outer frame portion 51 to be fixed thereat with metal clips and the like (not shown) while the seat skin 52 is pulled so that predetermined tensile force in the vehicle front-rear direction is produced.

The seat supporting members 54 are attached to the two pairs of (four) supporting member attachable portions 518 formed on the lower surface of the outer frame portion 51. The seat supporting member 54 is formed of an elastic member such as rubber. As shown in FIG. 7 and FIG. 8, the seat supporting member 54 includes a cylindrical main body portion 541 and a protrusion 542 protruding from the main body portion 541. The seat supporting member 54 is attached to the outer frame portion 51 by inserting the protrusion 542 into the through-hole 518a of the supporting member attachable portion 518 formed on the lower surface of the outer frame portion 51.

As shown in FIG. 7 and FIG. 8, the round shaped portions 56 are formed of the seat skin 52 curved at both left and right sides of the seating position 55. In this embodiment, the round shaped portions 56 are formed along the entire length of the left and right side portions of the seat 50. In the round shaped portions 56, the left and right frame portions 511 are disposed below the curved seat skin 52 via the cushion member 53.

The seat supporting portion 57 is formed of the above-described supporting member attachable portion 518 and the seat supporting member 54. Specifically, in this embodiment, the seat supporting portions 57 are formed as a pair on each of the front portion and the rear portion of the lower surface of the outer frame portion 51. More specifically, the seat supporting portions 57 provided on the front portion of the outer frame portion 51 are disposed at positions overlapping with the recessed portions 515 of the outer frame portion 51 in the vehicle front-rear direction. The seat supporting portions 57 provided on the rear portion of the outer frame portion 51 are disposed in front of the pair of protruding portions 517 on the lower surface of the outer frame portion 51.

The seat supporting portions 57 are supported by the vehicle-body frame 10 while the seat 50 is attached to the vehicle-body frame 10. The load applied to the seat 50 is transmitted to the vehicle-body frame 10 through the seat supporting portions 57.

Next, a connection structure between the seat 50 and the vehicle-body frame 10 will be described.

As shown in FIG. 2, in this embodiment, a pair of first extending portions 131 and a pair of second extending portions 132 are formed behind the fuel tank 28 which is a position at which the seat 50 is disposed on the pair of seat rails 13. The first extending portions 131 extend toward the inner side in the vehicle width direction. The second extending portions 132 disposed on the rear side of the pair of first extending portions 131 extend toward the inner side in the vehicle width direction.

As shown in FIG. 2 to FIG. 4, the fender cowl 64 includes portions disposed along the inner side surfaces of the pair of seat rails 13 in the vehicle width direction. As shown in FIG. 3, rear portions of the fender cowl 64 extend outward toward the outer side in the vehicle front-rear direction from upper ends of the portions disposed along the inner side surfaces of the pair of seat rails 13 to cover the upper sides of the pair of seat rails 13. Specifically, at front portions of positions on the upper surface of the seat rails 13 on which the seat 50 is disposed, the pair of seat rails 13 are exposed. Meanwhile, at rear portions of the position on which the seat 50 is disposed, the pair of seat rails 13 are covered by the fender cowl 64.

As shown in FIG. 2, a pair of through-holes 641 are formed in portions positioned on the front side of the pair of second extending portions 132 in the rear portion of the fender cowl 64.

As shown in FIG. 2, the seat 50 is disposed on the upper surface sides of the pair of seat rails 13 in the following manner. Specifically, the pair of seat supporting portions 57 provided in the front portion of the lower surface of the outer frame portion 51 are disposed on the pair of first extending portions 131, while the pair of seat supporting portions 57 provided in the rear portion of the lower surface of the outer frame portion 51 are disposed on the fender cowl 64 at the portions covering the upper surfaces of the seat rails 13.

As shown in FIG. 4 and FIG. 6, the seat 50 is fixed by fastening the pair of fastening portions 516 protruding from the lower surfaces of the left and right outer frame portions 511 to the inner side surfaces of the pair of seat rails 13 with bolts. The pair of protruding portions 517 being disposed on the lower surface of the left and right frame portion 511 and having distal end sides protruding toward the rear are inserted into spaces below the pair of second extending portions 132 through the pair of through-holes 641. Thus, the seat 50 is fixed to the vehicle-body frame 10 (seat rail 13) while being directly or indirectly supported by the seat rails 13 at the seat supporting portions 57.

The above-described seat structure of this embodiment provides following advantageous effects.

The seat structure includes the outer frame portion 51 provided with the through-hole 514, the seat skin 52 that is fixed to the outer frame portion 51 with predetermined tensile force applied thereto and covers the through-hole 514, and the cushion member 53 disposed between the outer frame portion 51 and the seat skin 52. Thus, the seating position 55 of the seat 50 includes a portion of the seat skin 52 facing the through-hole 514. Thus, the cushioning property of the seating position 55 of the seat 50 can be secured with the elastic deformation of the seat skin 52 disposed at the portion facing the through-hole 514 without disposing the cushion member 53 at the seating position 55. Thus, the seat height can be made low while securing the cushioning property of the seat 50.

The seat structure includes the recessed portions 515 formed on the left and right frame portions 511, and the cushion member 53 disposed between the left and right frame portions 511 and the seat skin 52 on the upper surface and side surfaces in the vehicle width direction of the left and right frame portions 511 on which the recessed portions 515 are formed. Thus, the legs of the occupant seated on the seat 50 can be positioned at the recessed portions 515 and his or her foot can reach the ground. Thus, high reach to the ground can be secured. While the legs of the occupant contact the recessed portions 515, soft feel can be given to the legs. Thus, comfortableness of the occupant seated on the seat 50 can be improved.

On the motorcycle 1, the occupant repeatedly switch between a normal state of sitting on the seat 50 and an inclined state where the occupant is seated while displacing his or her body in a vehicle width direction from the seating position 55 for turning or the like. Thus, the seat structure includes the round shaped portions 56 and the left and right frame portions 511 are disposed below the round shaped portions 56. Thus, the cushioning property of the seating position 55 during the normal state can be secured with the elasticity of the seat skin 52. In the inclined state, the load of the occupant can be directly received by the round shaped portions 56 and the left and right frame portions 511 positioned below the round shaped portions 56. Thus, in the inclined state, the load can be directly transmitted from the occupant to the motorcycle 1. Accordingly, lightness of the driving operation for turning the vehicle and the like can be improved.

The cushion member 53 is disposed between the outer frame portion 51 and the seat skin 52 at the position other than the portion facing the through-hole 514. Thus, the shape of the seat 50 around the seating position 55 can be formed into a desired shape by the cushion member 53. Thus, at the portion around the seating position 55 on which the load of the occupant is not largely applied, the cushion member 53 disposed around the through-hole 514 can provide comfortable fit to the legs of the occupant. Thus, comfortableness of the occupant seated on the seat 50 can be improved.

The outer edge portion of the outer frame portion 51 is disposed outward of the cushion member 53 in the portion excluding the recessed portions 515. Thus, the tensile force applied to the seat skin 52 can be directly received by the outer frame portion 51 in the portion excluding the recessed portions 515 and especially at the outer edge portion of the front frame portion 512 and the outer edge portion of the rear frame portion 513 disposed in the directions in which the seat skin 52 is pulled. Thus, sufficient tensile force applied to the seat skin 52 can be secured in the seating position 55. Thus, the comfortableness of the occupant seated on the seat 50 can be improved.

The seat structure includes the seat supporting portions 57 provided at the positions overlapping with the recessed portions 515 on the outer frame portion 51 in the vehicle front-rear direction. Thus, the load applied to the outer frame portion 51 can be transmitted to the vehicle-body frame 10 (seat rail 13) through the seat supporting portions 57. When the load from an outer side is applied to the recessed portion 515 upon turning and the like, the elastic deformation of the outer frame portion 51 as a whole can be reduced while the portion of the outer frame portion 51 positioned outward of the seat supporting portion 57 in the vehicle width direction and the cushion member 53 can be elastically deformed effectively. As a result, comfortableness of the occupant can be further improved. The portion of the outer frame portion 51 positioned outward of the seat supporting portion 57 in the vehicle width direction can be elastically deformed. Thus, the thickness of the cushion member 53 disposed on the outer frame portion 51 can be reduced without degrading the comfortableness. Thus, the seat height can be made lower while securing the cushioning property of the seat 50.

Although the preferred embodiment of the present invention has been described, the present invention is not limited to the above-described embodiment and can be embodied in various forms.

For example, in this embodiment, the outer edge portion of the outer frame portion 51 is disposed outward of the cushion member 53 in the portion of the outer frame portion 51 excluding the recessed portions 515. The structure is not limited to this. Specifically, the outer edge portion may be disposed outward of the cushion member 53 only at the front frame portion and the rear frame portion where the tensile force is applied to the seat skin.

In this embodiment, the seat skin 52 includes the elastic seat member 521 and the skin seat member 522. The structure is not limited to this and the seat skin may be formed of the elastic seat member only.

What is claimed is:

1. A seat structure for a saddle-ride type vehicle, the seat structure comprising:
    an outer frame portion including:
        front and rear frame portions;
        left and right frame portions extending between and interconnecting the front and rear frame portions, said left and right frame portions extending in a front-rear direction of said seat structure and being disposed along left and right side surfaces of the seat structure, respectively;
        wherein said front, rear, left and right frame portions cooperate to define a through-hole, said through-hole being disposed at a seating position for an occupant to sit on;
        wherein outer edge portions of the left and right frame portions include recessed portions, said recessed portions extending inwardly in a width direction of the seat structure so as to extend relatively toward one another;
    a seat skin that has elasticity, is fixed to the outer frame portion while predetermined tensile force is applied thereto, and is disposed to cover a portion facing the through-hole; and,
    a cushion member disposed between the left and right frame portions and the seat skin, at least on an upper surface and outer edge portions of the left and right frame portions on which the recessed portions are formed.

2. The seat structure for the saddle-ride type vehicle according to claim 1, further comprising seat supporting portions disposed at positions overlapping with the recessed portions in the outer frame portion in the front-rear direction and configured to transmit a load of the seat to a vehicle body.

3. The seat structure for the saddle-ride type vehicle according to claim 1, wherein the cushion member is disposed between the outer frame portion and the seat skin at a position other than the portion facing the through-hole.

4. The seat structure for the saddle-ride type vehicle according to claim 3, further comprising seat supporting portions disposed at positions overlapping with the recessed portions in the outer frame portion in the front-rear direction and configured to transmit a load of the seat to a vehicle body.

5. The seat structure for the saddle-ride type vehicle according to claim 3, wherein an outer edge portion of the outer frame portion is disposed outward of the cushion member in a portion excluding the recessed portions.

6. The seat structure for the saddle-ride type vehicle according to claim 5, further comprising seat supporting portions disposed at positions overlapping with the recessed portions in the outer frame portion in the front-rear direction and configured to transmit a load of the seat to a vehicle body.

7. The seat structure for the saddle-ride type vehicle according to claim 1, wherein
    the seat includes round shaped portions formed of the seat skin curved at both left and right sides of the seating position, and
    the left and right frame portions are disposed below the round shaped portions.

8. The seat structure for the saddle-ride type vehicle according to claim 7, further comprising seat supporting portions disposed at positions overlapping with the recessed portions in the outer frame portion in the front-rear direction and configured to transmit a load of the seat to a vehicle body.

9. The seat structure for the saddle-ride type vehicle according to claim 7, wherein the cushion member is disposed between the outer frame portion and the seat skin at a position other than the portion facing the through-hole.

10. The seat structure for the saddle-ride type vehicle according to claim 9, further comprising seat supporting portions disposed at positions overlapping with the recessed portions in the outer frame portion in the front-rear direction and configured to transmit a load of the seat to a vehicle body.

11. The seat structure for the saddle-ride type vehicle according to claim 9, wherein an outer edge portion of the outer frame portion is disposed outward of the cushion member in a portion excluding the recessed portions.

12. The seat structure for the saddle-ride type vehicle according to claim 11, further comprising seat supporting portions disposed at positions overlapping with the recessed portions in the outer frame portion in the front-rear direction and configured to transmit a load of the seat to a vehicle body.

* * * * *